United States Patent [19]
Kiss

[11] Patent Number: 4,648,934
[45] Date of Patent: Mar. 10, 1987

[54] APPARATUS FOR THREE-DIMENSIONAL MOLDINGS

[76] Inventor: Günter H. Kiss, Willdenowstrasse 20, D-1000 Berlin 45, Fed. Rep. of Germany

[21] Appl. No.: 607,427

[22] Filed: May 7, 1984

[30] Foreign Application Priority Data

May 26, 1983 [DE] Fed. Rep. of Germany ....... 3319391

[51] Int. Cl.$^4$ ............................................. B32B 31/00
[52] U.S. Cl. ..................... 156/443; 156/214; 156/224; 156/228; 156/323; 425/374; 425/398
[58] Field of Search ............... 156/214, 224, 228, 242, 156/245, 347, 443, 475, 476, 500, 323; 425/45, 374, 383, 394, 398, 457

[56] References Cited

U.S. PATENT DOCUMENTS

| | | | |
|---|---|---|---|
| 3,271,222 | 9/1966 | Moorman | 156/214 |
| 3,640,653 | 2/1972 | Laenen et al. | 425/45 |
| 3,686,051 | 8/1972 | Samuel et al. | 156/245 |
| 3,953,273 | 4/1976 | Faller | 156/245 |
| 4,078,959 | 3/1978 | Palfey et al. | 156/214 |
| 4,378,265 | 3/1983 | Kiss | 156/242 |
| 4,415,399 | 11/1983 | Geisinger | 156/475 |

FOREIGN PATENT DOCUMENTS 2338650 10/1978 Fed. Rep. of Germany .
3028241 2/1982 Fed. Rep. of Germany .
3028242 11/1982 Fed. Rep. of Germany .

Primary Examiner—Jay H. Woo
Assistant Examiner—Timothy W. Heitbrink
Attorney, Agent, or Firm—Basile, Weintraub & Hanlon

[57] ABSTRACT

A process for making moldings with areas of marked final deformation from highly sensitive materials, such as tangled-fiber fleeces, in which the flat material is molded in the softened state between press molds. Prior to the actual molding process and independent of the desired molding of the final molding in a particular area and without any precompression of the material, the material is mechanically drawn between the corresponding press molds to such an extent that the resulting material flow roughly corresponds to the feed requirement for the final molding operation. The necessary auxiliary device comprises one or more push-rods with ram heads, which can be brought between the press molds when the press is in the open position and can be moved in the desired directions in the manner of an automated human fist.

13 Claims, 10 Drawing Figures

APPARATUS FOR THREE-DIMENSIONAL MOLDINGS

BACKGROUND OF THE INVENTION

I. Field of the Invention

The present invention relates to a process for molding three-dimensional moldings and to an apparatus for performing this process.

II. Description of the Prior Art

Wherever it is necessary to shape flat starting materials which cannot be exposed to compression and stretching actions due to their structure or composition, difficulties are more particularly encountered during the molding process if the three-dimensional moldings to be produced have areas with a large final deformation or shaping. This problem is explained hereinafter relative to tangled-fiber fleece material, with particular reference to the production of moldings from binder-containing cellulose or lignocellulose mats.

In the production of moldings from tangled-fiber fleece blanks, which are softened and made deformable by heat action and the action of superheated steam, there is an increased risk of the fibrous fleece or non-woven fabric tearing during the molding process, because the fiber bonding union is largely removed by the heat treatment. If the moldings to be produced have considerable final deformations, it must be ensured that this tearing is prevented. This has hitherto been brought about by initially preshaping the thermally plasticized, flat tangled-fiber blank in cold premolding equipment, accompanied by the precompression thereof. Premolding has roughly the same three-dimensional configuration as the subsequent final molding (German Pat. No. 23 38 650). The required premolding means are, in part, very complicated, because they comprise male molds, covering, in each case, a shaping region with a specific degree of shaping, which are moved independently of one another in the sequence of the degrees of shaping from an open position into a pressing position. Thus, in this known process, apart from the expensive final molding press mold, it is necessary to have corresponding expensive molds for the premolding process.

In addition, separate presses are required for premolding, so that the total costs of the known procedure are further increased. In addition, for thermal plasticization, thermal energy is required, which is lost by the cooling of the molding following the premolding process.

It has therefore been proposed to make the overall process more economic in that, although carrying out premolding and final molding in two separate operating stages, they are performed using one plasticization stage, heat in successive travels in a single press and, consequently, without any intermediate cooling of the tangled-fiber fleece (German Pat. No. 30 28 242 and corresponding U.S. Pat. No. 4,378,265). This reduces the mold expenditure by a half mold, because e.g. the male mold for the premolding process can also be used for final molding and the aforementioned thermal energy loss is avoided. However, this process still requires precisely contoured premolding means having the same complicated construction as the final molding means which can only be used for a specific finished part so that their cost must be fully added to the final molding cost.

SUMMARY OF THE INVENTION

The purpose of the present invention is to further reduce the cost of the premolding equipment, particularly that part specific to the particular final molding, so as to increase the flexibility of the process and the apparatus for performing the same.

Due to the fact that the material to be shaped is fed towards the particularly critical deformation areas of the press mold without it being necessary to produce a premolding approximately corresponding to the finished molding, at least one complicated and costly contour-adapted premolding member is rendered superfluous. As contour-adaptation is the main cost factor in the production of premolding equipment, this constitutes a considerable cost saving compared with the prior art. An important advantage compared with the hitherto known process results from the fact that during the feeding of blanks made from non-woven fabrics or the like, they do not come in whole-surface contact with the press mold which is heated to high temperatures. This, for example, prevents premature hardening of duroplastic binder constituents in the non-woven fabric.

It is particularly advantageous that the flat material to be molded, following thermal plasticization, can be directly placed in the press mold for producing the final molding and then, after feeding the non-woven fabric to the desired deformation areas, no further material has to be conveyed during the actual molding process. This renders transportation stability of the premoldings superfluous; which was required in the prior art two-stage process in order to convey the premolding from the premolding station to the hot press mold. It is particularly advantageous that an adapted premolding contour is no longer necessary because there is no need for the insertion in a separate press mold for which an adapted contour is required. When, according to the prior art, premolding and final molding can be performed without intermediate cooling of the tangled-fiber fleece, the supply of non-woven fabric is always bound by the contour-precise premolding. The invention eliminates this link between the supply of the non-woven fabric and a contour-precise premolding. A precise contour is not required for either transportation or charging reasons.

The aforementioned process can be advantageously further developed in that the feeding in of the non-woven fabric is influenced in a planned manner by fixing the non-woven fabric blank or similar material to be shaped during the feeding operation in partial areas thereof in such a way that comparatively little or no material can be supplied from these areas. This ensures that there is no reciprocal influencing of the feeding processes with the resulting inadmissible tensile stresses in the non-woven fabric in the case of a particularly complicated shaping operation in which the material has to be supplied, for example, to several deformation regions. For example, this can also be the case when there is a convex press tool area between two concave press tool areas with a larger deformation. The supply or feeding of materials is understood to mean any type of material transfer including the advancing of material to a single point.

As the tangled-fiber fleeces which are preferred generally contain duroplastic binders, it is advantageous to mold the finished molding by using pressure and heat. However, the present process can also be carried out in unheated press tools, if the tangled-fiber fleece exclusively contains thermoplastically acting binders. It is particularly advantageous during the supply of the non-woven fabric that there is no whole-area surface contact between the mat and the cold mold so that the thermoplastic binders do not solidify in a premature manner.

For the performance of the present process, it is advantageous to use apparatus making it possible to bring about a corresponding supply of non-woven fabric to the desired deformation areas of the press mold and particularly those with a marked final deformation. The separately movable auxiliary device is introduced into and removed from the open press mold, i.e. between the two mold halves. The apparatus must ensure that there is an adequate feeding of non-woven fabric.

An advantageously improved production sequence is obtained if the separately movable auxiliary device supplies the press mold with the non-woven fabric blank and/or removes from the press mold the finished part molded during the preceding working cycle. As secondary movements of the working cycle take place simultaneously with the performance of the feeding in of the non-woven fabric, an optimum timing sequence is ensured.

The present process makes it possible to use greatly simplified auxiliary devices in the form of rams for feeding or supplying the non-woven fabric. The ram which can be moved in and out of the open press mold is not in contact with the fabric blank during this movement. A mold area is geometrically associated with the ram and, when necessary, non-woven fabric is supplied thereto. Such rams are easily manufactured components which, unlike the hitherto required premolding means, are not intended for the production of one specific molding, but can if necessary be used for production of other finished moldings. This greatly increases the flexibility and profitability of the overall production process.

The supply of the non-woven fabric can be advantageously assisted in that the ram end facing the fabric blank has an interchangeable head, which is rounded on all sides. The rounding of the head prevents the tearing of the fabric blanks in contact area with the ram end head during feeding independent of the die angle.

The interchangeability of the heads makes it possible, to solve all practically occurring feed problems using a standard set of heads having different sizes and geometrical configurations, so that there is no longer any need for special premolding equipment for a particular final molding. A further advantage compared with the prior art is that the individual rams enabling the supply of the fabric are capable of a movement direction forming a random angle with the surface orientation of the press mold. This is particularly advantageous in the case of complicated molding operations in which a large amount of fabric has to be fed in because undesired frictional forces which occur when pulling around acute angles can be reduced by the selection of the ram direction. This is fundamentally possible in the known procedure by using additional slide molds. However, the production of the latter requires considerable effort and expenditure and makes mold maintenance much more costly.

The ram heads can be made from various materials, provided that they have the necessary thermal stability. It is advantageous if the heads are made from an elastomer, preferably one having a high thermal stability, because in this case they have additional adaptation possibilities to different deformation geometries. It is also possible to use heads made from a resiliently deformable hollow body, which is filled with gas or liquid. In the case of such heads, it is possible to have a considerable additional contour adaptation accompanied by limited adaptation forces so that the means are given even greater stability. Such a ram can be constructed in the form of an inflatable air cushion or the like.

If a considerable amount of non-woven fabric has to be fed into larger areas within the press mold, the apparatus can be advantageously further developed so that several heads jointly act on a deformable intermediate layer in such a way that the non-woven fabric is supplied to a larger deformation area of the mold tool. In this procedure, the deformable intermediate layer ensures that the feed-in areas pass into one another and that there is a reduction or elimination of material compression or inadmissible tensile stress at the transition points between the ram heads. The deformable intermediate layer offers the additional possibility of carrying out necessary local contour adaptations during the feeding process without having to use specially contoured and therefore expensive auxiliary equipment.

The construction of a simple auxiliary device with one or more rams for feeding in non-woven fabrics can be advantageously further developed such that the separately movable auxiliary device comprises a frame guided on guidance members in which the drive elements of the rams in the form of pneumatically or hydraulically driven cylinders are convertibly fixed. The fixing points for the drive elements of the rams can be distributed in a gird-like manner over the entire frame surface, so that a frame whose size corresponds to the usable mounting surface of the press operating the press molds can be used as an auxiliary device for all final moldings carried out on this press. The fixing of the drive cylinders of the rams to the fixing grid of the frame can, for example, take place in the form of spherical heads, so that the rams can be set to random angles. If several rams act jointly on a deformable intermediate layer, the latter can either be directly fixed to the frame of the auxiliary device, or it can be fixed thereto with the aid of resilient components if the layer is not intended to cover the complete surface of the frame.

In this construction, the production cycle can be improved in that on the bottom of the frame are provided known components for conveying the non-woven fabric blank; while on the top of the frame components are provided which fix the molding obtained from the preceding working cycle in such a way that it can be removed from the open press mold together with the frame. The necessary movement time of the auxiliary member during the insertion and removal with respect to the open press mold is advantageously utilized for the charging and emptying of the press so that the idle periods of the working cycle are reduced to a minimum.

In the case of complicated shapes where a large amount of non-woven fabric has to be supplied, it can be advantageous to construct the separately movable auxiliary device with a plurality of rams, which are moved in a time-staggered manner. This makes it possible to avoid inadmissible tensile stressing of the non-woven fabric which can result from the coincidence of feed processes from different directions. This also makes it possible to supply more non-woven fabric without the fabric blank failing as a result of tearing or thinning.

The separately movable auxiliary device can also comprise a rotary and pivotally articulated bracket carrying a working head with at least one ram movable or rotatable about at least one axis. The time and geometrical movement sequence of the auxiliary device can be made programmable. It is possible to produce such an auxiliary device in the form of industrial robots which are multi-programmable and can be used for different working processes. Unlike the case of auxiliary devices in frame form which are intended for a particular mold size, such industrial robots can be universally programmed for random non-woven fabric supply operations and can be used on presses of different size.

The maximum effectiveness of the equipment used occurs if the movement sequence of the separately movable auxiliary device, and the movement sequence of the press which operates the press mold are coupled together in such a way that there is, at least a semiautomatic working cycle; coupling taking place with the aid of mechanical components, such as limit switches and/or electronic means and/or path-timed and time-cycled programmable small computers. This minimizes idle time and the time required for operating the production means for performing the present process, so as to increase the overall production profitability.

BRIEF DESCRIPTION OF THE DRAWINGS

The description herein makes reference to the accompanying drawings wherein like reference numerals refer to like parts throughout the several views, and in which.

DETAILED DESCRIPTION OF THE INVENTION

Figure 1:
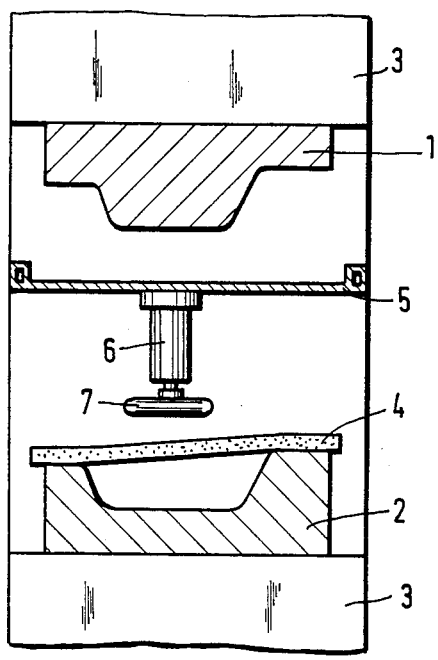
FIG. 1 is a diagrammatical illustration of an apparatus employing the inventive process illustrating separated upper and lower press molds having a press die disposed thereinbetween.

Referring now to the drawings and, in particular, to FIG. 1, there is illustrated an upper hot press mold 1, a lower hot press mold 2 and a press 3 operating the molds 1 and 2. A non-woven fabric blank 4 rests on the lower press mold 2. A separately movable auxiliary device comprises a frame structure 5, a pneumatically driven push-rod 6 and a ram head 7 fixed thereto. The separately movable auxiliary device comprising components 5, 6 and 7 can be moved into and out of the open molds on guidance members, which are not shown in FIGS. 1 to 4. FIG. 1 illustrates the initial position before the start of the non-woven fabric feed operation according to the invention.

Figure 2:
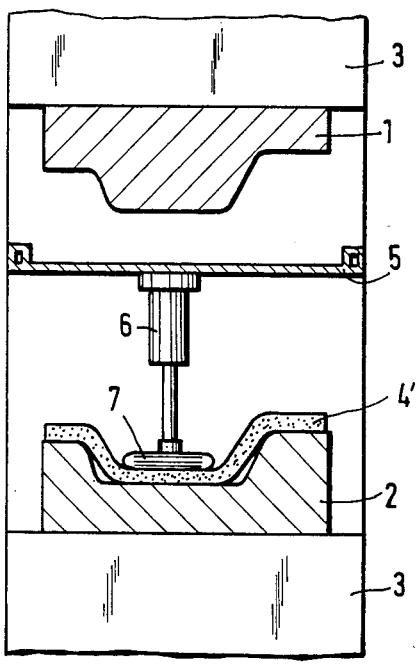
FIG. 2 shows a stage of the process in which a fabric blank has been locally pressed by the press die.

FIG. 2 shows a stage in the process according to the invention in which the fabric feed-in has just finished and the fabric blank 4 has been locally pressed into the lower hot press mold 2 by the lowering of ram head 7. Non-woven fabric is fed in from the edge and the original blank 4 has assumed shape 4' which is not identical with the contour of the lower press mold 2.

Figure 3:
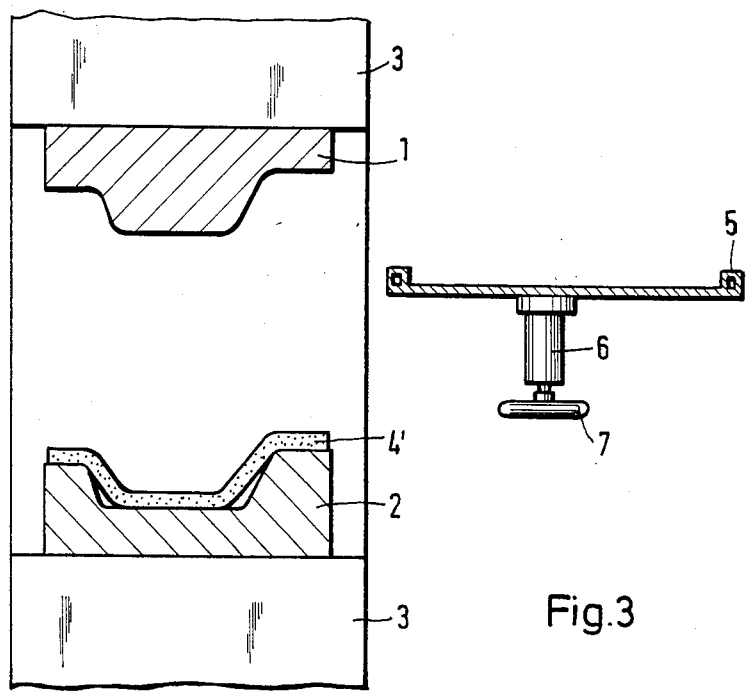
FIG. 3 shows a stage of the process wherein the press die has been removed from the open molds.
Figure 4:
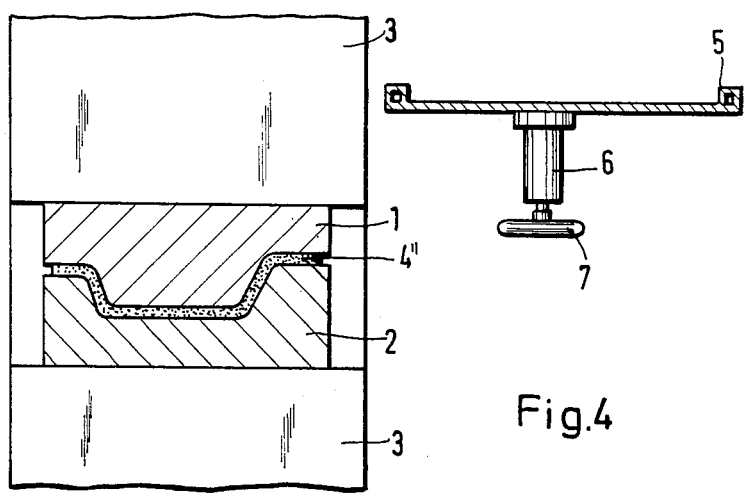
FIG. 4 illustrates a stage of the process of molding the fabric blank.

FIG. 3 shows the process stage in which the fabric feed, as shown in FIG. 2, is at an end and the separately movable auxiliary device comprising components 5, 6, 7 has been removed from the open molds 1 and 2 after retraction of ram head 7. The original, approximately flat non-woven fabric blank 4, has assumed the pre-curved shape 4' as a result of the feeding in of the fabric. The necessary quantity of non-woven fabric has been fed in to the mold to ensure that a faultless final molding is obtained. FIG. 4 shows the stage of molding the fabric blank 4' to a final molding 4" by lowering of the upper hot press 1. Following curing of the shaped final molding 4", it is possible to open the molds 1 and 2, reinsert the separately movable auxiliary device and return to the initial state as shown in FIG. 1 for the next production cycle.

Figure 5:
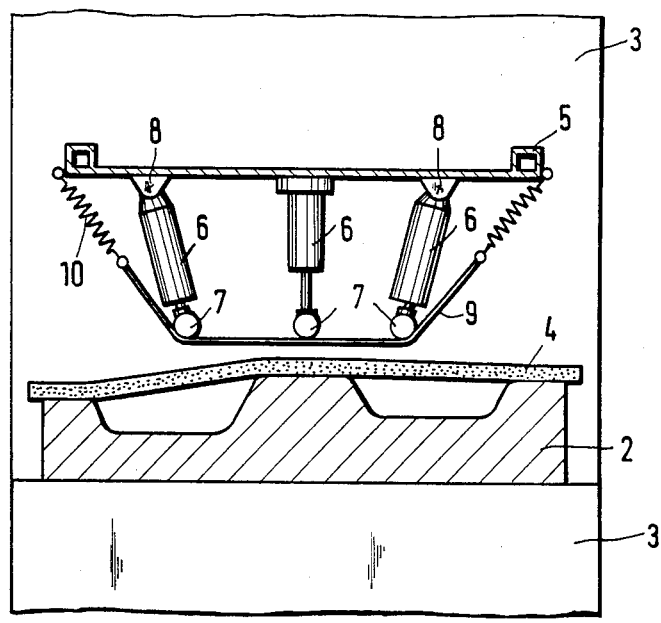
FIG. 5 illustrates a lower hot press mold on which is disposed a fabric blank and illustrating apparatus having separately movable auxiliary devices in which several rams act in a time-staggered manner on a deformable intermediate layer.

FIG. 5 shows a lower hot press mold 2 which has already been charged with the non-woven fabric blank 4. The contour of the desired finished part is, in this case, more complicated than shown in FIGS. 1 to 4. The separately movable auxiliary device shown in FIG. 5 once again comprises a frame structure 5 and, in this case, three rams 6, the two outer rams being inclined with the aid of a pivotable fixing means 8 with respect to the movement direction of the press. The ram heads 7 jointly act on a deformable intermediate layer 9 which, with the aid of a plurality of clamping members 10, is so suspended on the frame structure 5 that it is spanned over the ram heads 7. The upper mold 1 is not shown, because in FIGS. 5 to 7 only the feeding in of the non-woven fabric is represented.

Figure 6:
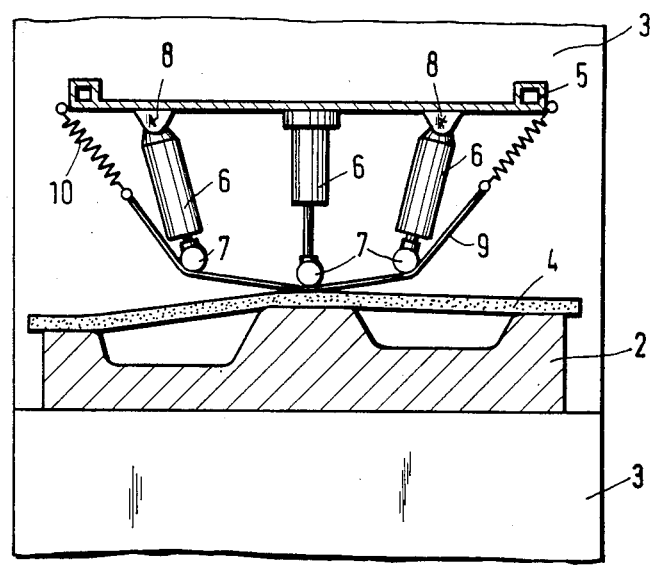
FIG. 6 illustrates the first phase of fabric supply with the central ram having moved downward into engagement therewith.

FIG. 6 illustrates the first phase of fabric supply, the central ram head 7 having been moved downwards, presses the deformable intermediate layer downwards to such an extent that the non-woven fabric is fixed and secured in the vicinity of the raised center of the hot press mold 2, so that during the subsequent feeding of fabric, no material can be withdrawn from this area, which would inadmissibly weaken the same.

Figure 7:
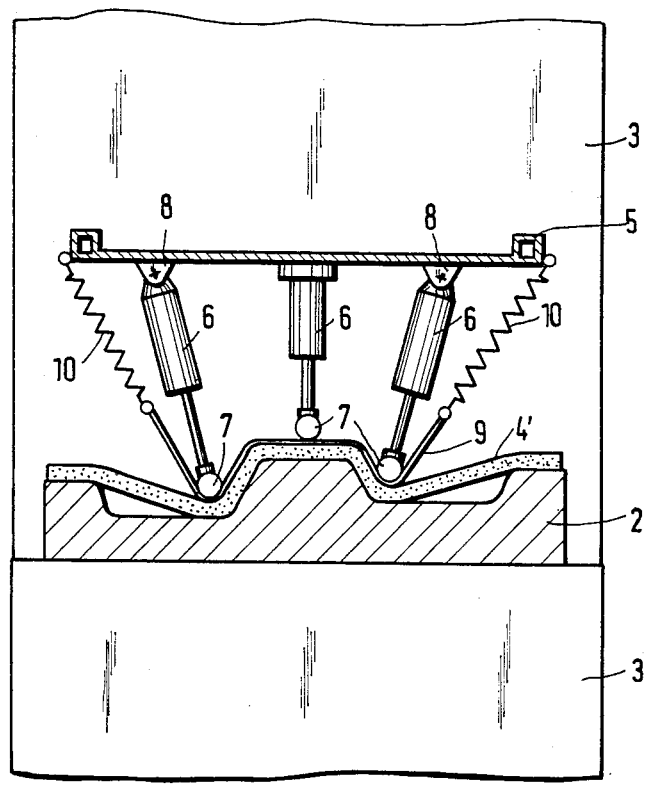
FIG. 7 illustrates a second stage of the process in which outer rams have been lowered.

FIG. 7 shows the second stage in the supply of the non-woven fabric. The two sloping outer ram heads 7 have been lowered so that the fabric blank 4 has been fed towards the opposite sides of the central area. The deformable intermediate layer 9, which is held taut by the resilient clamping members 10, ensures that in the critical central area, the material is held, after feeding, over a larger surface area by applying pressure to the lower mold 2, so that there is no fabric weakening in this critical area. The cooperation between the ram movement and the resilient clamping members 10 brings about a movement of the deformable intermediate layer 9 which is very similar to a rolling movement. This largely prevents tensile stresses during feeding of material into the critical central area of the lower hot press mold 2, so that a faultless final molding is achieved.

Figure 8:
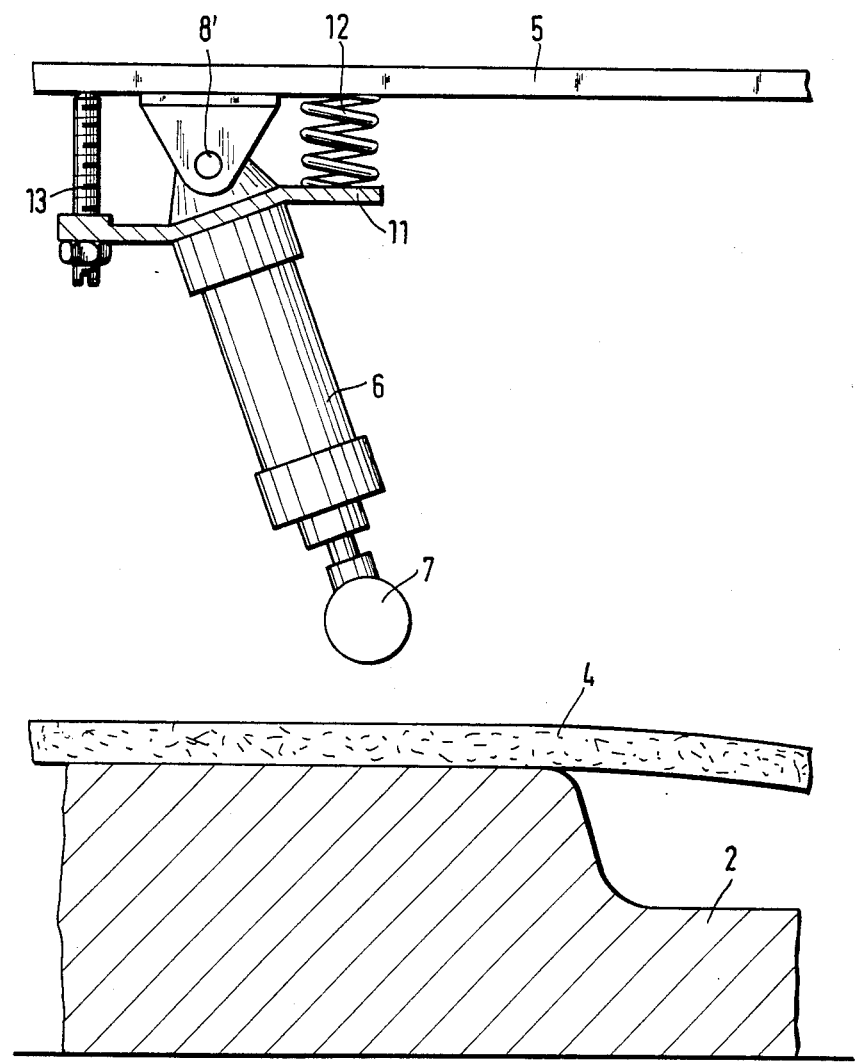
FIG. 8 illustrates a particularly advantageous fitting of the ram illustrated in FIG. 5.

Finally, FIG. 8 illustrates a particularly advantageous mounting of push-rod 6 to frame structure 5. This arrangement makes it possible to transport non-woven fabric, not only by feeding to particular areas of the hot press mold 2 but, by feeding fabric from the outside to exposed areas. Since during the advancing of the non-woven fabric, tensile stresses are prevented, this variant of an apparatus, according to the invention, constitutes a particularly favorable solution for the case of the molding having locally defined, difficultly shapable areas, which require increased feeding in of non-woven fabric. This latter possibility is achieved in that the push-rod 6, which carries the rounded ram head 7, is fixed with the aid of a movable swivel bearing 8' to frame structure 5. As a result of an adjustable setscrew 13 and spring 12, the push-rod 6 is fixed in the represented position with the aid of a support plate 11.

Figure 9:
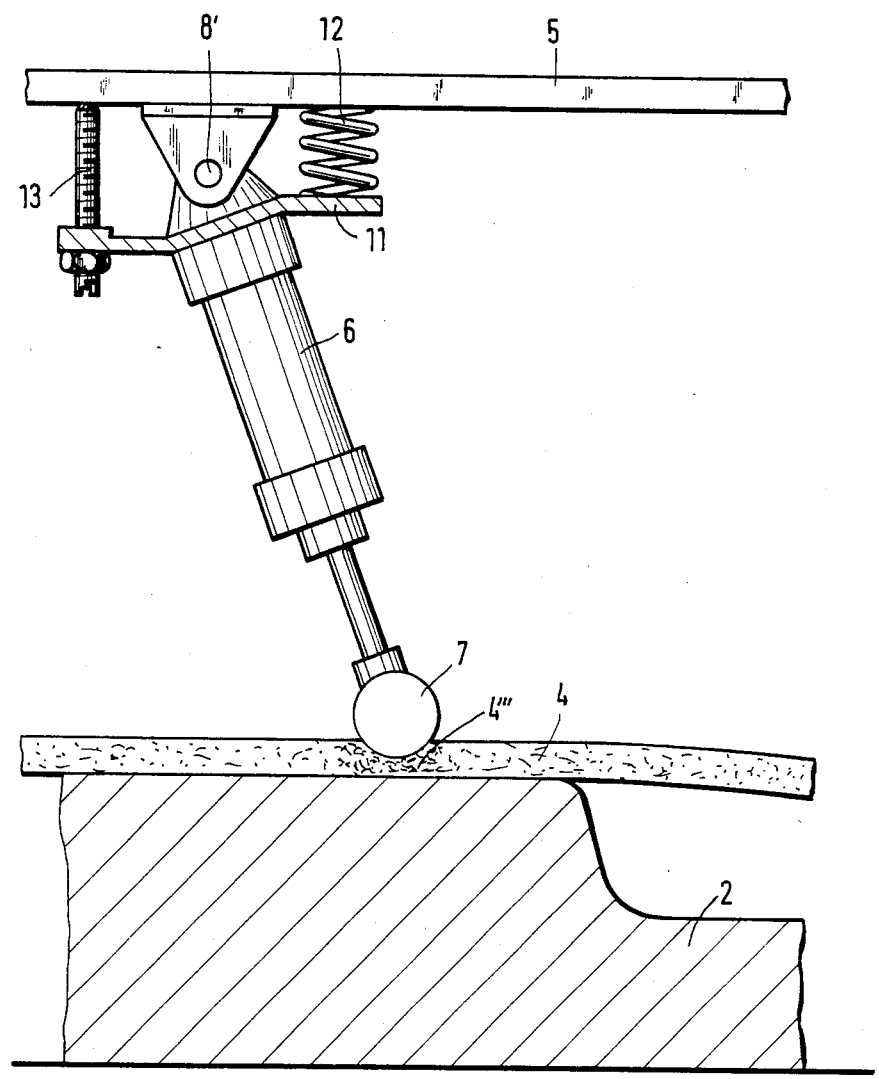
FIG. 9 is a view similar to FIG. 8 but showing the next phase of ram movement.

FIG. 9 shows the next phase of ram movement. The ram head 7 has now reached its provisional end position on the fabric blank 4. Push-rod 6 and all the components fixed thereto (13, 11 and 12) still have the same position as illustrated in FIG. 8.

Figure 10:
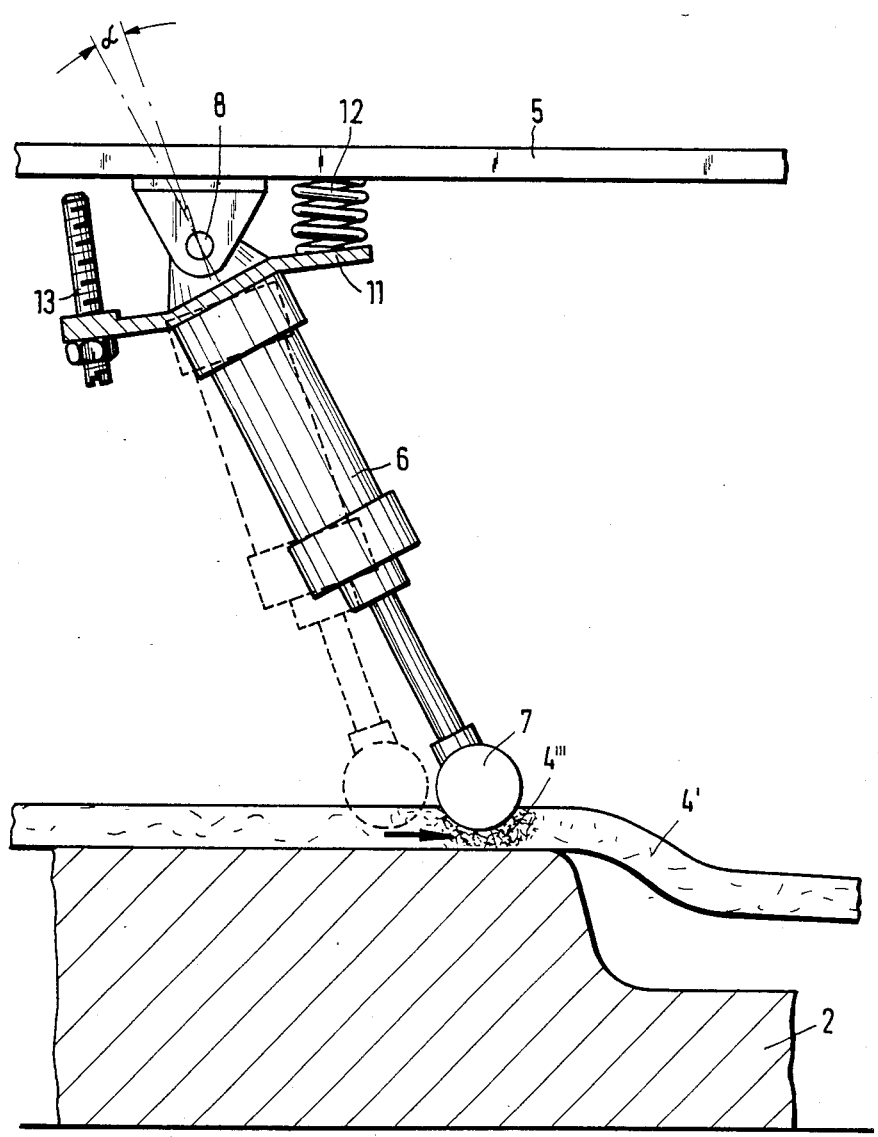
FIG. 10 illustrates the final step of feeding of a non-woven fabric through a further extension of the ram wherein the rams illustrated in FIGS. 8–10 are diagrammatically illustrative of the possibility of connection of the rams of separately movable auxiliary devices not only to supply non-woven fabric where tensile stresses occur, but to also supply it to partial areas where it is more favorable for the stressing of the fabric.

FIG. 10 finally illustrates the feeding of non-woven fabric through an even further extension of push-rod 6 with the ram head 7 fixed to its end. During the further extension of push-rod 6, ram head 7 is supported on a precompressed area 4''' of fabric blank 4. Due to the eccentricity between this force application point and swivel bearing 8', the push-rod 6 changes its original angular position and pivots into the represented position (the push-rod position corresponding to that depicted in FIG. 9 is shown in broken line form). During this angular swiveling of push-rod 6 by angle α, ram head 7 moves in the direction of the arrow and advances the fabric in the direction of the cavity of the lower press mold 2 where it is required for molding purposes. The originally flat fabric blank 4 (FIG. 9) once again assumes the curved shape 4' (FIG. 10). The swivel bearing construction 8' of FIGS. 8 to 10 can naturally be replaced by any corresponding prior art movable construction. It is particularly advantageous if the mobility necessary for angle changing purposes and the resilience characteristics against the stop are simultaneously ensured by movable resilient metal-rubber elements, which can assume the function of the swivel bearing 8' and spring 12 of FIGS. 8 to 10.

What is claimed is:

1. In an apparatus for molding three-dimensional moldings from flat materials in which the flat material is molded between closeable and openable, opposed press molds in a softened state, the improvement comprising:
   an auxiliary device movable backward and forward between the open press molds, the auxiliary device comprising a frame structure, a push rod, and a ram head attached to the push rod;
   the frame structure movable backward and forward between the open press molds;
   at least one push-rod pivotally mounted at a first end on the frame structure, a second free end of the push-rod opposed to the first end being extensible into contact with the surface of the material to be molded to press such material into one of the press molds; and
   wherein the movement direction of the push-rod forms an angle with the direction of movement of press molds.

2. The apparatus of claim 1 wherein the free end of the push-rod carries an interchangeable head.

3. The apparatus of claim 1 wherein the push-rod head is made from an elastomeric material.

4. The apparatus of claim 1 wherein the push-rod head is coated with an elastomeric material.

5. The apparatus of claim 1 wherein a plurality of push-rods are mounted on the frame structure, individual push-rods being successively and independently moved against the surface of the material to be molded such that a first push-rod fixingly contacts an initial portion of the material holding the initial portion firmly between the ram and one of the press molds, and remaining push-rods subsequently contact other portions of the surface of the material to press it into one of the press molds.

6. The apparatus of claim 5 further including:
   a deformable intermediate layer which is insertable between the push-rod and the material to be molded in a pre-deformation area of the press molds; and wherein
   at least one of the push-rods heads acts on the deformable intermediate layer at the pre-determined deformation area of the press mold.

7. The apparatus of claim 5 wherein the auxiliary device includes:
   guidance members mounted between the press molds for controlling the movement of the frame between the press molds;
   wherein the push rod is in the form of an extensible fluid driven cylinder.

8. The apparatus of claim 7 wherein one side of the frame is provided with first means for gripping the material to be conveyed into the mold; and
   a second gripping means being formed on the opposite side of the frame for securing the material molded during a previous work cycle so that the second gripping means is movable out of the open press mold together with the frame.

9. The apparatus of claim 5 wherein at least one push-rod is guided by an articulated bracket which has a working head rotatable about at least one axis.

10. The apparatus of claim 1 wherein the push-rod is constructed in the form of an inflatable air cushion.

11. In an apparatus for molding three-dimensional moldings from flat materials in which the flat material is fed in a given direction and is molded between closeable and openable, opposed press molds in a softened state, the improvement comprising:
    an auxiliary device movable backward and forward between the open press molds, the auxiliary device comprising a frame structure, a push-rod and a ram head attached to the push-rod;
    at least one push-rod pivotally mounted at a first end on the frame structure, a second free end of the push-rod opposed to the first end being extensible into contact with the surface of the material to be molded to press such material into one of the press molds; wherein at least one arm is pivotally connected to the auxiliary movable device in a direction of the intended flow of the material so that the point of contact between the ram head and the surface of the material to be molded is displaced in the feed direction of the material relative to a center of the pivoting movement of suspension of the ram to the auxiliary movable device.

12. The apparatus of claim 11 further including:
    means for biasing the ram to a start position in a retracted state.

13. The apparatus of claim 11 wherein the push-rod is fixed to the frame structure by means of a resilient pivotable fixing member.

* * * * *